US006512933B1

(12) United States Patent
Kalofonos et al.

(10) Patent No.: US 6,512,933 B1
(45) Date of Patent: Jan. 28, 2003

(54) ITERATIVE SYSTEM AND METHOD FOR OPTIMIZING CDMA LOAD DISTRIBUTION USING REVERSE INTERFERENCE MEASUREMENTS

(75) Inventors: Dimitris Kalofonos, Watertown, MA (US); Donna Fagen, Lexington, MA (US)

(73) Assignee: Verizon Laboratories Inc., Waltham, MA (US)

( * ) Notice: Subject to any disclaimer, the term of this patent is extended or adjusted under 35 U.S.C. 154(b) by 0 days.

(21) Appl. No.: 09/514,654

(22) Filed: Feb. 29, 2000

(51) Int. Cl.[7] .................................................. H04Q 7/30
(52) U.S. Cl. ..................... 455/522; 455/63; 455/524; 455/67.1
(58) Field of Search ................................ 455/522, 525, 455/453, 450, 451, 423, 422, 63, 67.1, 67.3, 69; 370/335

(56) References Cited

U.S. PATENT DOCUMENTS

| 5,697,053 A | * | 12/1997 | Hanly ..................... 455/525 X |
| 5,907,543 A | * | 5/1999 | Jeon et al. ................ 455/63 X |
| 6,034,952 A | * | 5/2000 | Dohi et al. .............. 455/522 X |
| 6,104,933 A | * | 8/2000 | Frodigh et al. ............. 455/522 |
| 6,128,500 A | * | 10/2000 | Raghavan et al. ....... 455/453 X |
| 6,188,906 B1 | * | 2/2001 | Lim et al. ............... 455/522 X |

OTHER PUBLICATIONS

Hanly S., "An Algorithm for Combined Cell–Site Selection and Power Control to Maximize Cellular Spread Spectrum Capacity", IEEE Journal on Selected Areas in Communications, vol. 13, No. 7, Sep. 1995, pp. 1332–1340.
Yates R. and Huang C., "Integrated Power Controlled and Base Station Assignment", IEEE Transactions on Vehicular Technology, vol. 44, No. 3, Aug. 1995, pp. 634–644.
"Modeling the Hand–off Mechanism Effect on the In–Cell and Other–Cell Interference of IS–95 Cellular CDMA Networks", D. Kalofonos and D. Fagen—IEEE Vehicular Technology Conference, Sep. 1999, Amsterdam, Holland, pp. 1–5.

* cited by examiner

Primary Examiner—William Trost
Assistant Examiner—Philip J. Sobutka
(74) Attorney, Agent, or Firm—Leonard Charles Suchyta; James K. Weixel

(57) ABSTRACT

A system (200) provides a network designer with a mechanism by which to quickly optimize the load distribution in a wireless communication network (100) by iteratively modifying the pilot power settings within an analysis session. The system (200) determines a reverse interference level for the network (100). The system (200) then adjusts the pilot power level of each sector by an amount equal to the difference between a sector's reverse interference level and the network's reverse interference level. The system (200) assigns, based on the adjusted pilot power levels, each wireless device (140) in the network (100) to a sector.

37 Claims, 3 Drawing Sheets

ITERATIVE SYSTEM AND METHOD FOR OPTIMIZING CDMA LOAD DISTRIBUTION USING REVERSE INTERFERENCE MEASUREMENTS

FIELD OF THE INVENTION

The present invention relates generally to communication systems and, more particularly, to an iterative system and method for optimizing traffic load distribution in a Code Division Multiple Access (CDMA) based wireless network.

BACKGROUND OF THE INVENTION

The function of assigning each mobile station in a network to a set of CDMA base station sectors is termed "CDMA cell loading" or "CDMA traffic load distribution." The uneven spatial distribution (i.e., the random location of wireless devices) and density of CDMA offered traffic loads, as well as non-uniform terrain and other factors, make the assignment of each wireless device in the network to the sectors that are closest to its location inefficient and suboptimal.

Several theoretical attempts have been made to address the problem of optimal load distribution in order to maximize the capacity of CDMA cellular networks. Two such theoretical attempts have been described in S. Hanly, "An Algorithm for Combined Cell-Site Selection and Power Control to Maximize Cellular Spread Spectrum Capacity," IEEE Journal on Selected Areas in Communications, Vol. 13, No. 7, September 1995, and R. Yates et al., "Integrated Power Control and Base Station Assignment," IEEE Transactions on Vehicular Technology, Vol. 44, No. 3, August 1995. The implementation of the theoretical algorithms described in these documents in a practical system is extremely difficult since it is assumed that each wireless device has continuous information regarding the path loss between its location and all surrounding CDMA sectors (reverse link), as well as on the interference level experienced by all these sectors.

In order to address this problem in practical IS-95-based CDMA networks, each wireless device is assigned to a set of base stations (best CDMA servers) based on forward link received pilot power over interference (Ec/Io) measurements at the location of the wireless device. In order to optimize cell loading and, therefore, the CDMA capacity of an IS-95-based system, a network designer should set the pilot powers of all CDMA sectors at levels such that the resulting traffic distribution based on forward link Ec/Io measurements would be the same as the theoretical distribution based on reverse link information.

Using existing methods, a network designer would approximate the cell loading optimization problem by selecting an initial set of pilot transmit powers and performing a full CDMA simulation. The network designer then assesses the results of the simulation and a new set of pilot power settings would be introduced, followed by a new full CDMA simulation. This process would be repeated several times in a trial and error manner until satisfactory pilot power settings are derived. One skilled in the art would appreciate, however, that full-scale CDMA simulations, due to their complexity and accuracy, generally take several hours or days to get results. Therefore, the above-described trial and error adjustments may lead to a considerable amount of time being wasted analyzing network parameters that may not be useful.

As a result, there exists a need for a system and method that quickly determine an optimal load distribution and the pilot power levels needed to achieve the distribution.

SUMMARY OF THE INVENTION

Systems and methods consistent with the present invention address this need by providing an iterative process that determines an optimal load distribution in a communication network as well as the pilot power levels necessary to achieve the optimal load distribution.

A system consistent with the present invention determines the reverse interference level at each sector in the network and an average reverse interference level for the network. The system then adjusts the pilot power level of each sector by an amount equal to the difference between a sector's reverse interference level and the network's average reverse interference level. The system then assigns, based on the adjusted pilot power levels, each wireless device in the network to a sector.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of implementations consistent with the present invention refers to the accompanying drawings. The same reference numbers in different drawings identify the same or similar elements. Also, the following detailed description does not limit the invention. Instead, the scope of the invention is defined by the appended claims.

Systems and methods consistent with the present invention provide a mechanism that provides optimized traffic load distribution in a wireless network and the pilot power settings needed to achieve the optimized distribution.

EXEMPLARY NETWORK

Figure 1:
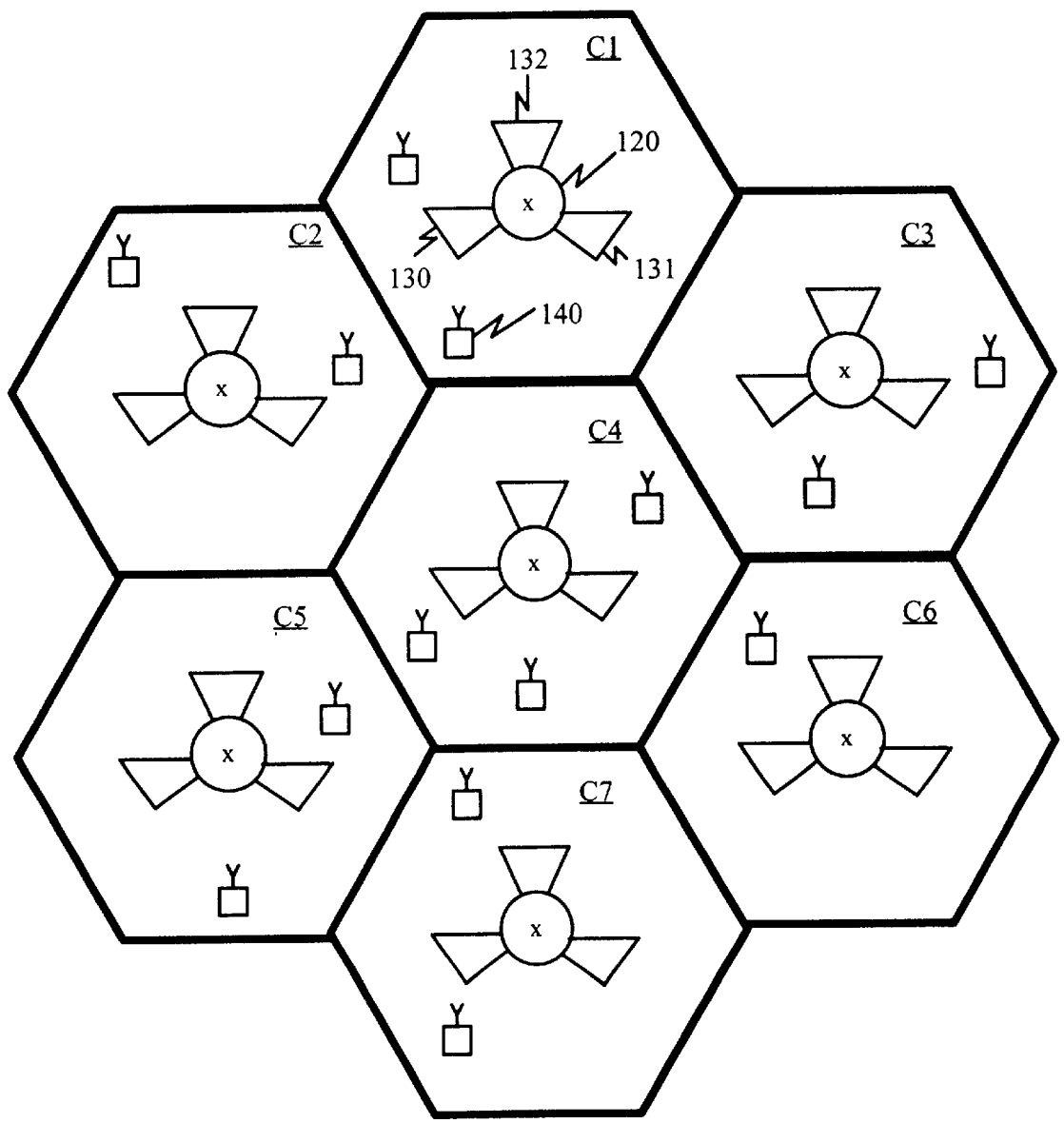
FIG. 1 illustrates an exemplary wireless communication network on which systems and methods, consistent with the present invention, capable of optimizing the traffic load distribution of a network may operate.

FIG. 1 illustrates an exemplary wireless communication network 100 on which systems and methods, consistent with the present invention, capable of optimizing the load distribution of a network may operate. In FIG. 1, network 100 includes several contiguous wireless coverage areas, or cells, C1–C7. While the network 100 shows only seven cells, the actual number of cells may be larger or smaller in practice.

Each of the cells C1–C7 includes a base station 120, having a group of directional antennas 130–132, and may, at any given time, include one or more conventional wireless devices 140. The base station 120 may include a conventional base station that receives information from and transfers information to the wireless devices 140 via the directional antennas 130–132. The directional antennas 130–132 of a particular cell C1–C7 split the respective cell into sectors of equal size. Each directional antenna 130–132 may transmit pilot, paging, sync, and traffic information to the wireless devices 140 served by that particular antenna. In practice, a base station 120 may include additional directional antennas or may alternatively include one or more omni-directional antennas (not shown).

The wireless devices 140 are conventional wireless devices, such as a cellular telephone, a personal digital assistant, and the like. Each wireless device 140 communicates with the base station 120 in a well-known manner. The wireless device's 140 list of most probable servers determines the base station 120 and antenna 130–132 with which a particular wireless device 140 communicates. This list contains the most probable sectors in the network 100 that have been identified by the wireless device 140 as transmitting with the highest pilot strength to interference ratio.

EXEMPLARY SYSTEM CONFIGURATION

Figure 2:
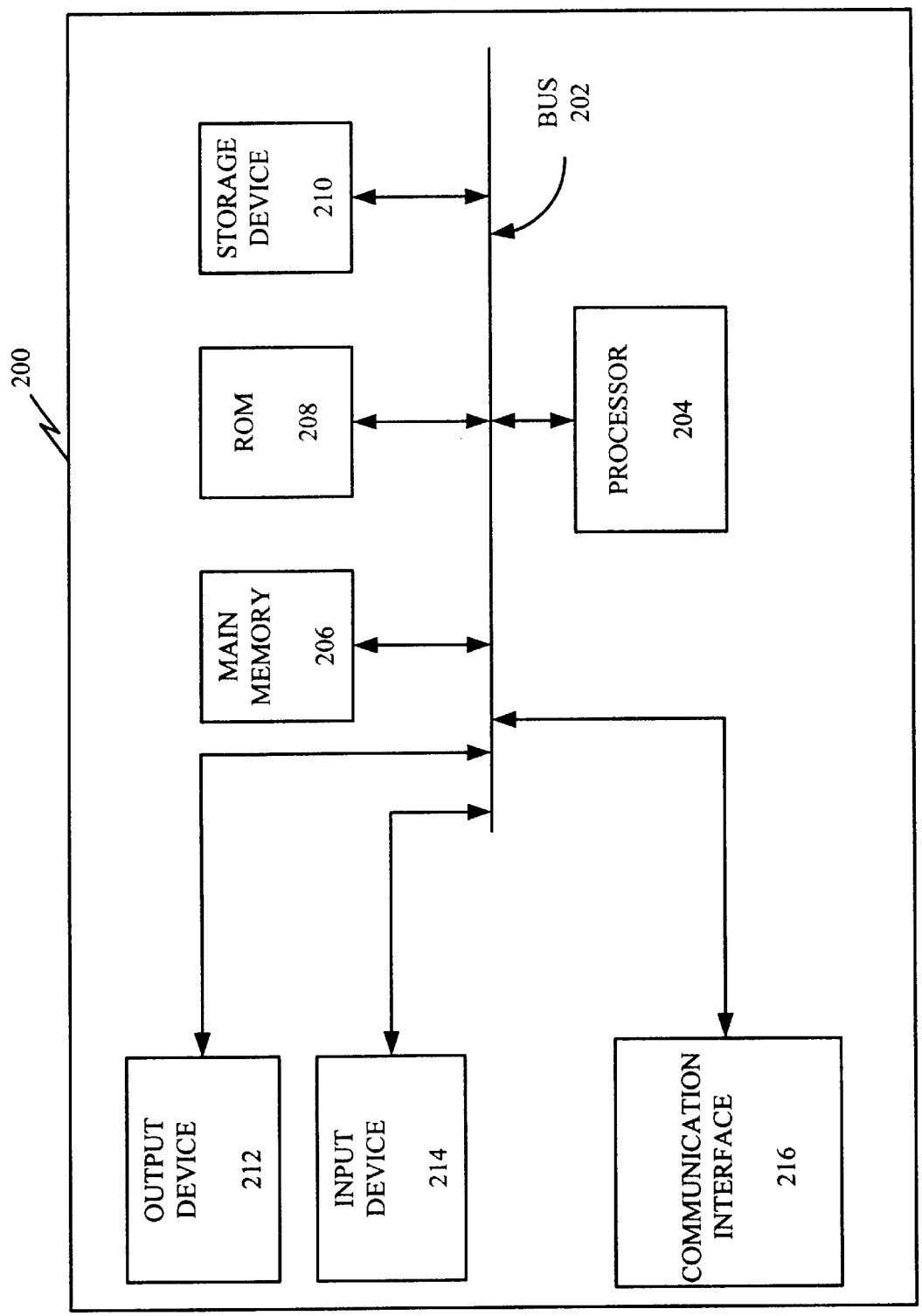
FIG. 2 illustrates an exemplary system, consistent with the present invention, for optimizing traffic load distribution in a wireless network.

FIG. 2 illustrates an exemplary system 200, consistent with the present invention, for determining and evaluating the optimal load distribution of a wireless network, such as network 100. The exemplary system 200 may be included in the wireless communication network 100 (e.g., in base station 120) or may be separate therefrom.

In FIG. 2, the exemplary system 200 includes a bus 202, a processor 204, main memory 206, read only memory (ROM) 208, storage device 210, output device 212, input device 214, and communication interface 216. The bus 202 allows for data transfer among the components of the system 200.

The processor 204 may be any type of conventional processing device that interprets and executes instructions. Main memory 206 may be a random access memory (RAM) or a similar dynamic storage device that stores information and instructions for execution by processor 204. Main memory 206 may also store temporary variables or other intermediate information used during execution of instructions for use by processor 204. ROM 208 may include a conventional ROM device or other type of static storage device that stores static information and instructions for processor 204. The data storage device 210 may include any type of magnetic or optical disk and its corresponding disk drive. Data storage device 210 stores information and instructions for use by processor 204.

The output device 212 includes one or more devices for providing information to an operator. The output device 212 may include, for example, a display device, a printer, a pair of speakers, etc. The input device 214 includes one or more devices that allow the operator to interact with the system 200. The input device 214 may include, for example, a keyboard, a mouse, a pen, voice recognition and/or biometric mechanisms, and the like.

Communication interface 216 may include any type of transmitting/receiving device that enables the system 200 to communicate with other devices/systems via any communications medium, such as a wired, wireless, or optical connection. For example, communication interface 216 may be a modem or an Ethernet interface to a local area network (LAN). Alternatively, communication interface 216 may be any other interface that enables communication between the system 200 and other devices or systems.

The system 200 performs the functions necessary to optimize the load distribution of a wireless communication network in response to processor 204 executing sequences of instructions contained in, for example, memory 206. Such instructions may be read into memory 206 from another computer-readable medium, such as storage device 210, or from another device via communication interface 216. Execution of the sequences of instructions contained in memory 206 causes processor 204 to perform a method that will be described hereafter. Alternatively, hardwired circuitry may be used in place of or in combination with software instructions to implement the present invention. Thus, the present invention is not limited to any specific combination of hardware circuitry and software.

EXEMPLARY PROCESS

The process of designing a network can be both a time and computation-intensive task. Before committing to a full-scale network analysis (which can take from hours to days to complete), there is typically a need to quickly determine, without extensive detail, an optimal set of parameters for a particular network design.

Figure 3:
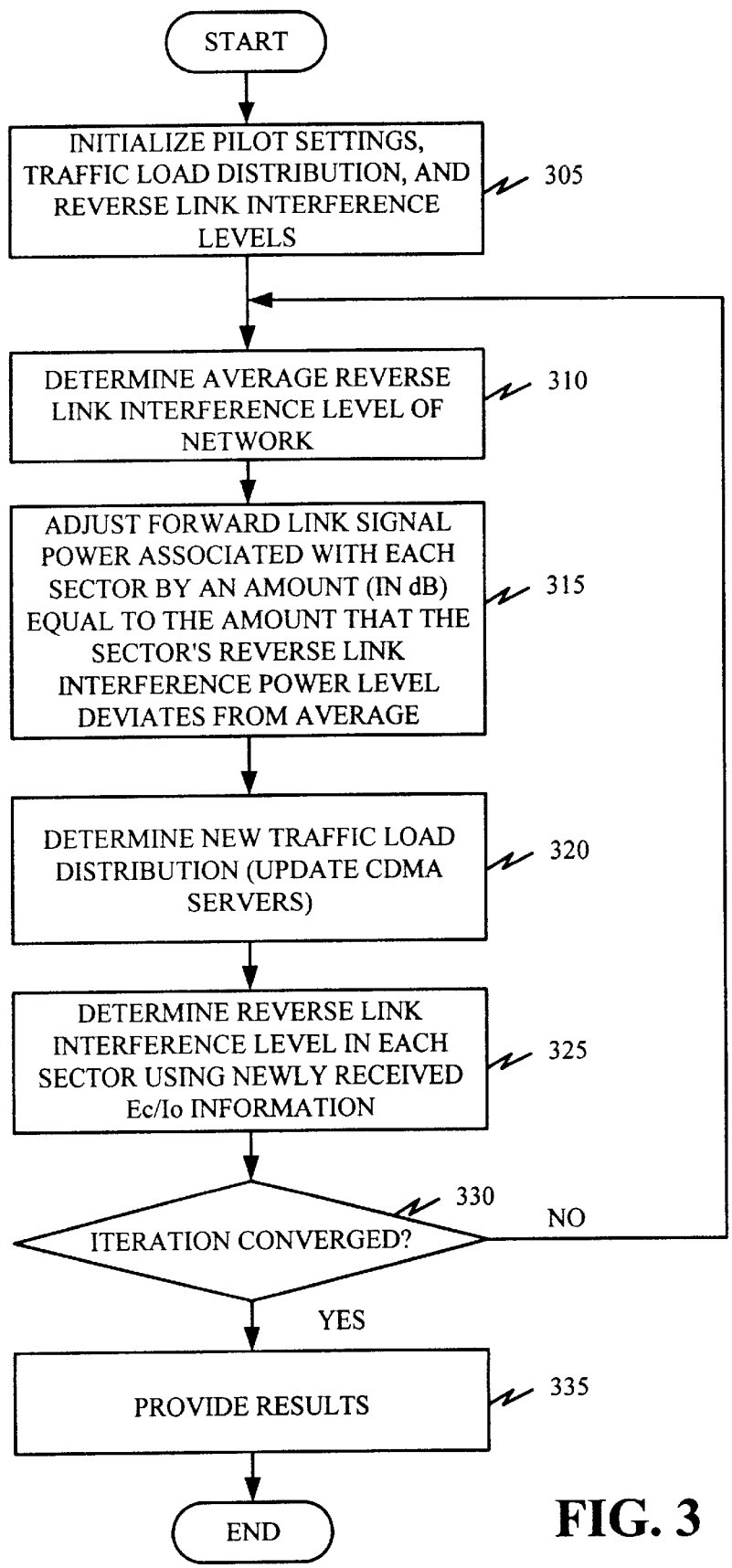
FIG. 3 illustrates an exemplary process, consistent with the present invention, for determining and evaluating the optimal traffic load distribution of a wireless network by adjusting the pilot powers.

FIG. 3 illustrates an exemplary process, consistent with the present invention, for determining and evaluating the optimal traffic load distribution of a wireless network, such as network 100, by adjusting the pilot powers. The system 200 begins by initializing the pilot settings, the traffic load distribution for the wireless network 100, and the reverse link interference levels [step 305]. The reverse link interference level is defined as the ratio (difference in the logarithmic scale) between the total noise (i.e., interference plus thermal noise) power spectral density at the receiver of a base station sector, and the thermal noise only power spectral density (i.e., no interfering users). The system 200 determines the initial levels of the reverse link interference for each sector in the network 100 using received pilot strength to interference (Ec/Io) values. The received Ec/Io values may be based on user-defined nominal pilot power values and may be previously stored in, for example, main memory 206.

The system 200 determines an average reverse link interference level value for all sectors in the network 100 [step 310]. The system 200 may determine this average reverse link interference level value for the network 100 using any well-known technique. The system 200 then adjusts the forward link signals (i.e., the pilot, paging, sync, and nominal traffic powers) for each sector in the network 100 by an amount (e.g., in decibels) that the base station's sector's reverse link interference level value deviates from the average value [step 315]. For example, assume that the system 200 determines that a particular sector of a base station 120 has a reverse link interference level equal to 2 dB and determines the average reverse link interference level of the network 100 to be 4 dB. The system 200 would adjust the forward link signals (i.e., the pilot, paging, sync, and nominal traffic powers) of the particular sector by 2 dB (i.e., the difference between the sector's determined reverse link interference level and the determined average reverse link interference level).

The system 200 determines a new load distribution for the network 100 by assigning, based on the adjusted forward link signals, each wireless device 140 in the network 100 to a new set of best servers (i.e., the sector(s) that provides the wireless device 140 with the best Ec/Io value) [step 320]. The system 200 determines the new set of best servers based on the adjusted forward link signals and the average reverse link interference level value.

The system 200 then determines a new reverse link interference level value for each sector in the network 100 [step 325]. The system 200 determines these values using new Ec/Io values corresponding to the new pilot power settings. Steps 310–325 are repetitively performed until the system 200 determines that a particular iteration has converged [step 330]. The system 200 determines that a particular iteration has converged if the determined required signal level (which directly depends on the sector's reverse interference level) for all the sectors is within a predetermined step size of the required signal level from a previous iteration. For example, assume that the step size is specified as 0.5 dB. If the required signal level for all sectors is within 0.5 dB of the required signal level of all the sectors for a previous iteration, then the system 200 determines that the current iteration has converged. It should be noted that if the process does not converge within a certain number of iterations, the process may be set to stop. This will prevent the system from continuously performing steps 310–325 for a set of parameters that will never converge. In such a case, the system 200 uses the last set of determined values as its output.

Finally, the system 200 provides the results to the user [step 335]. The results may include the values of the new reverse interference levels for the sectors in the network, the power levels of the forward link signals in each sector, an indication of a wireless device's new set of best servers, etc. The results may be provided to the user via any conventional technique. For example, the results may be provided visually to the user via a display device, such as output device 212.

The foregoing process may be using in conjunction with a reverse interference algorithm that is based on forward link Ec/Io information, such as the one described in "Modeling the Hand-off Mechanism Effect on the In-Cell and Other-Cell Interference of IS-95 Cellular CDMA Networks," D. Kalofonos and D. Fagen, IEEE Vehicular Technology Conference, September 1999, pp. 1–5.

CONCLUSION

Systems and methods consistent with the present invention aid network designers by providing a process for quickly determining an optimal traffic load distribution for a proposed network design as well as the pilot power settings necessary to achieve the optimal load distribution.

The foregoing description of exemplary embodiments of the present invention provides illustration and description, but is not intended to be exhaustive or to limit the invention to the precise form disclosed. Modifications and variations are possible in light of the above teachings or may be acquired from practice of the invention. For example, while a series of steps have been provided with respect to FIGS. 3 and 4, the order of the steps does not matter.

The following claims and their equivalents define the scope of the invention.

What is claimed is:

1. A method for distributing traffic in a digital network having one or more sectors, each sector having an initial reverse interference level, and one or more wireless devices, the method comprising:
   determining a reverse interference level for the digital network;
   adjusting a forward link signal power level associated with each sector by an amount equal to a difference between a sector's initial reverse interference level and the network's reverse interference level; and
   assigning, based on the adjusting, each wireless device to a sector.

2. The method of claim 1 further comprising:
   determining, based on the adjusting, new reverse interference levels for each sector.

3. The method of claim 2 further comprising:
   providing at least one of the new reverse interference levels, the adjusted forward link signal power levels, and the wireless device assignment to a user.

4. The method of claim 2 further comprising:
   repeating the determining of a reverse interference level for the digital network using the new reverse interference levels, adjusting a forward link power signal level, assigning each wireless device to a sector, and determining new reverse interference levels, the repeating being continued until a converged result exits.

5. The method of claim 1 wherein the adjusting includes:
   adjusting pilot, paging, sync, and nominal traffic powers associated with each sector by the amount.

6. The method of claim 1 wherein the determining a reverse interference level for the digital network includes:
   determining an average reverse interference level using the initial reverse interference levels of the one or more sectors.

7. The method of claim 1 wherein the assigning includes:
   assigning each wireless device to a set of sectors based on signal strength to interference values.

8. A system for distributing traffic in a digital network having one or more sectors, each sector having an initial reverse interference value, and one or more wireless devices, the system comprising:
   means for determining a reverse interference level for the digital network;
   means for adjusting a forward link signal power level associated with each sector by an amount equal to a difference between a sector's initial reverse interference level and the network's reverse interference level; and
   means for assigning, based on the adjusting, each wireless device to a sector.

9. A system for determining an optimum traffic load distribution in a digital network having one or more sectors, each sector having an initial reverse interference level, and one or more wireless devices, the system comprising:
   a memory configured to store instructions; and
   a processor configured to execute the instructions to determine a reverse interference level for the digital network; adjust a forward link signal power level associated with each sector by an amount equal to a difference between a sector's initial reverse interference level and the network's reverse interference level; and assign, based on the adjusting, each wireless device to a sector.

10. The system of claim 9 wherein the processor is further configured to:
    determine, based on the adjusted forward link signal power level for each sector, new reverse interference levels for each sector.

11. The system of claim 10 wherein the processor is further configured to:
    provide at least one of the new reverse interference levels, the adjusted forward link signal power levels, and the wireless device assignment to a user.

12. The system of claim 10 wherein the processor is further configured to:
    repeat the determining of a reverse interference level for the digital network using the new reverse interference levels, adjusting a forward link power signal level, assigning each wireless device to a sector, and determining new reverse interference levels, the repeating being continued until a converged result exits.

13. The system of claim 9 wherein, when adjusting, the processor is configured to:
adjust pilot, paging, sync, and nominal traffic powers associated with each sector by the amount.

14. The system of claim 9 wherein, when determining a reverse interference level for the digital network, the processor is configured to:
determine an average reverse interference level using the initial reverse interference levels of the one or more sectors.

15. The system of claim 9 wherein, when assigning, the processor is configured to:
assign each wireless device to a set of sectors based on signal strength to interference values.

16. A computer-readable medium containing instructions for controlling at least one processor to perform a method that distributes traffic in a network having one or more sectors, each sector having an initial reverse interference value, and one or more wireless devices, the method comprising:
determining a reverse interference level for the network;
adjusting a forward link signal power level associated with each sector by an amount equal to a difference between a sector's initial reverse interference level and the network's reverse interference level; and
assigning, based on the adjusting, each wireless device to a sector.

17. The computer-readable medium of claim 16 further comprising:
determining, based on the adjusting, new reverse interference levels for each sector.

18. The computer-readable medium of claim 16 further comprising:
providing at least one of the new reverse interference levels, the adjusted forward link signal power levels, and the wireless device assignment to a user.

19. The computer-readable medium of claim 17 further comprising:
repeating the determining of a reverse interference level for the digital network using the new reverse interference levels, adjusting a forward link power signal level, assigning each wireless device to a sector, and determining new reverse interference levels, the repeating being continued until a converged result exits.

20. The computer-readable medium of claim 16 wherein the adjusting includes:
adjusting pilot, paging, sync, and nominal traffic powers associated with each sector by the amount.

21. The computer-readable medium of claim 16 wherein the determining a reverse interference level for the digital network includes:
determining an average reverse interference level using the initial reverse interference levels of the one or more sectors.

22. The computer-readable medium of claim 16 wherein the assigning includes:
assigning each wireless device to a set of sectors based on signal strength to interference values.

23. A method for analyzing performance of a network having one or more sectors, each sector having a reverse interference level, and one or more wireless devices, the method comprising:
determining an average reverse interference level for the network;
determining an amount that each sector's level of reverse interference deviates from the average reverse interference level;
adjusting a power level of forward link signals of each sector by the amount;
assigning, in response to the adjusting, each wireless device to a sector; and
analyzing the network using one of the adjusting and assigning.

24. The method of claim 23 further comprising:
determining, based on the adjusting, a new reverse interference level for each sector; and
analyzing the network using the new reverse interference levels.

25. The method of claim 24 further comprising:
providing at least one of the wireless device assignment, the adjusted forward link signals, and the new reverse interference levels to a user.

26. The method of claim 24 further comprising:
repeating the determining of a reverse interference level for the network using the new reverse interference levels, adjusting a forward link power signal level, assigning each wireless device to a sector, and determining a new reverse interference level for each sector, the repeating being continued until a converged result exits.

27. The method of claim 23 wherein the adjusting includes:
adjusting one or more of a pilot power, a paging power, a sync power, and a nominal traffic power.

28. A system for analyzing performance of a network having one or more sectors, each sector having a reverse interference level, and one or more wireless devices, the system comprising:
a memory configured to store instructions;
a processor configured to execute the instructions to determine an average reverse interference level for the network; determine an amount that each sector's level of reverse interference deviates from the average reverse interference level; adjust a power level of forward link signals of each sector by the amount; assign, in response to the adjusting, each wireless device to a sector; and analyze the network using one of the adjusting and assigning.

29. The system of claim 28 wherein the processor is further configured to:
determine, based on the adjusting, a new reverse interference level for each sector; and
analyze the network using the new reverse interference levels.

30. The system of claim 29 wherein the processor is further configured to:
provide at least one of the wireless device assignment, the adjusted forward link signals, and the new reverse interference levels to a user.

31. The system of claim 29 wherein the processor is further configured to:
repeat the determining of a reverse interference level for the network using the new reverse interference levels, adjusting a forward link power signal level, assigning each wireless device to a sector, and determining a new reverse interference level for each sector, the repeating being continued until a converged result exits.

32. The system of claim 28 wherein, when adjusting, the processor is configured to:
adjust one or more of a pilot power, a paging power, a sync power, and a nominal traffic power.

33. A computer-readable medium containing instructions for controlling at least one processor to perform a method that analyzes a network having one or more sectors, each sector having a reverse interference level, and one or more wireless devices, the method comprising:

determining an average reverse interference level for the network;

determining an amount that each sector's level of reverse interference deviates from the average reverse interference level;

adjusting a power level of forward link signals of each sector by the amount;

assigning, in response to the adjusting, each wireless device to a sector; and analyzing the network using one of the adjusting and assigning.

34. The computer-readable medium of claim 33 further comprising:

determining, based on the adjusting, a new reverse interference level for each sector; and analyzing the network using the new reverse interference levels.

35. The computer-readable medium of claim 34 further comprising:

providing at least one of the wireless device assignment, the adjusted forward link signals, and the new reverse interference levels to a user.

36. The computer-readable medium of claim 34 further comprising:

repeating the determining of a reverse interference level for the network using the new reverse interference levels, adjusting a forward link power signal level, assigning each wireless device to a sector, and determining a new reverse interference level for each sector, the repeating being continued until a converged result exits.

37. The computer-readable medium of claim 33 wherein the adjusting includes:

adjusting one or more of a pilot power, a paging power, a sync power, and a nominal traffic power.

* * * * *